United States Patent
Jang et al.

(10) Patent No.: US 11,636,739 B2
(45) Date of Patent: Apr. 25, 2023

(54) APPARATUS FOR STORING MEDIUMS AND METHOD OF CONTROLLING THE SAME

(71) Applicant: HYOSUNG TNS INC., Seoul (KR)

(72) Inventors: Hyun Soo Jang, Seoul (KR); Jun Young Kim, Seoul (KR); Jin Yu Lim, Seoul (KR); Dahye Shin, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 17/548,836

(22) Filed: Dec. 13, 2021

(65) Prior Publication Data
US 2022/0198884 A1 Jun. 23, 2022

(30) Foreign Application Priority Data

Dec. 23, 2020 (KR) .......................... 10-2020-0182509
Dec. 23, 2020 (KR) .......................... 10-2020-0182510

(51) Int. Cl.
*G07F 19/00* (2006.01)
*G07D 11/20* (2019.01)
*G06K 7/10* (2006.01)

(52) U.S. Cl.
CPC ....... *G07F 19/203* (2013.01); *G06K 7/10415* (2013.01); *G07D 11/20* (2019.01); *G07F 19/202* (2013.01)

(58) Field of Classification Search
CPC ..... G07F 19/203; G07F 19/202; G07D 11/20; G06K 7/10415
USPC ........................................................ 235/379
See application file for complete search history.

(56) References Cited

U.S. PATENT DOCUMENTS

| 5,256,862 | A | 10/1993 | Watanabe et al. |
| 5,804,804 | A * | 9/1998 | Fukatsu ................. G07F 19/20 235/385 |
| 6,363,164 | B1 | 3/2002 | Jones et al. |
| 6,715,670 | B1 | 4/2004 | Swiatek et al. |
| 7,828,133 | B2 | 11/2010 | Kadowaki et al. |
| 2004/0062430 | A1 | 4/2004 | Buntscheck |
| 2018/0286164 | A1* | 10/2018 | Lee ....................... G07F 19/205 |

FOREIGN PATENT DOCUMENTS

JP         5760984 B2      8/2015
KR   10-2020-0124418 A   11/2020

OTHER PUBLICATIONS

Extended European Search Report of corresponding European Appln. EP 21212499.4 dated May 25, 2022.
Office Action in Korean Application No. 10-2020-0182510 dated Jul. 26, 2022 and English translation.
Office Action in Russian Application No. 2021138140 dated Sep. 12, 2022 and English translation.

* cited by examiner

*Primary Examiner* — Daniel A Hess
(74) *Attorney, Agent, or Firm* — Bacon & Thomas, PLLC

(57) ABSTRACT

An apparatus for storing a medium includes a safe having an entrance for replenishment and recovery to which a transit cassette is selectively connected, a reception unit configured to deposit and withdraw a medium by a customer, an identification unit serving to identify whether the medium is a normal banknote or a rejection banknote, a deposit cassette configured to store the medium deposited through the reception unit, a recycle cassette configured to store the medium recognized as the normal banknote, a conveyance path configured to convey the medium, and a control unit configured to control the conveyance path.

17 Claims, 11 Drawing Sheets

APPARATUS FOR STORING MEDIUMS AND METHOD OF CONTROLLING THE SAME

TECHNICAL FIELD

The present disclosure relates to an apparatus for storing mediums and a method of controlling the apparatus.

BACKGROUND

In general, an automated teller machine is an unmanned terminal that enables the deposit and withdrawal of a medium such as cash or checks regardless of time using a cash card or a passbook.

Such an automated teller machine may have a medium storage box that may store a medium such as cash or checks, and a proper amount of mediums may be stored in the medium storage box. The medium stored in the medium storage box may be taken out of the medium storage box by a customer's request for withdrawal, and a new medium may be carried into the medium storage box by a customer's request for deposit. As such, a proper amount of the medium stored in the medium storage box needs to be maintained in preparation for the customer's request for deposit or withdrawal, and it is necessary to manage and supervise whether a proper amount of mediums is stored in the medium storage box in real time.

However, when a company for replenishing the automated teller machine with mediums is far away from the automated teller machine, it is not easy for the company for replenishing the automated teller machine with mediums to manage the amount of mediums in the automated teller machine in real time.

For example, in the case that a specific type of banknotes is insufficient in the automated teller machine, the automated teller machine may be replenished with the specific type of banknotes through a customer's deposit before a management company replenishes the machine with the specific type of banknotes. Further, in the case that a specific type of banknotes is sufficient in the automated teller machine, the specific type of banknotes may be depleted in the automated teller machine through a customer's withdrawal before a management company replenishes the machine with a different type of banknotes.

Meanwhile, a conventional medium storing apparatus is problematic in that it is impossible to selectively take only a specific type of banknotes which need to be replenished among various types of banknotes out from a transit cassette, and to selectively take a desired amount of banknotes which need to be replenished therefrom. Therefore, there is a need for a medium storing apparatus configured to replenish the machine by taking a required type of banknotes and a required amount of banknotes out from a transit cassette that stores various types of banknotes, and to transmit an unnecessary type of banknotes back to the transit cassette.

SUMMARY

In view of the above, the present disclosure provides an apparatus for storing mediums and a method of controlling the apparatus, capable of replenishing a recycle cassette with a required type of banknotes and a required amount of banknotes from a transit cassette storing mediums, or recovering mediums stored in a recycle cassette to the transit cassette.

In accordance with a first aspect of the present disclosure, there is provided an apparatus for storing a medium including: a safe having an entrance for replenishment and recovery to which a transit cassette is selectively connected; a reception unit configured to deposit and withdraw a medium by a customer; an identification unit serving to identify whether the medium is a normal banknote or a rejection banknote; a deposit cassette configured to store the medium deposited through the reception unit; a recycle cassette configured to store the medium recognized as the normal banknote; a conveyance path configured to convey the medium; and a control unit configured to control the conveyance path.

The conveyance path may convey the medium between the entrance, the reception unit, the identification unit, the deposit cassette and the recycle cassette, and the control unit may be configured to control the conveyance path to convey the medium stored in the deposit cassette and the recycle cassette to the identification unit, and the medium identified as the normal banknote in the identification unit to the transit cassette.

The apparatus may further include a reject cassette configured to store the rejection banknote, wherein the control unit may be configured to control the conveyance path to convey the medium identified as the rejection banknote in the identification unit to the reject cassette.

The conveyance path may include: an upper conveyance path configured to provide a moving path of the medium deposited into and withdrawn from the identification unit; a lower conveyance path connected to the upper conveyance path to form a closed loop; a second branch conveyance path providing a medium moving path between the lower conveyance path and the recycle cassette; a third branch conveyance path providing a medium moving path between the lower conveyance path and the reject cassette; a fourth branch conveyance path providing a medium moving path between the entrance and a front connection point of the upper conveyance path and the lower conveyance path; and an eighth branch conveyance path providing a medium moving path between the lower conveyance path and the deposit cassette.

The control unit may be configured to control the second branch conveyance path, the eighth branch conveyance path, the lower conveyance path, and the upper conveyance path such that the medium stored in the recycle cassette and the deposit cassette is conveyed to the identification unit, control the upper conveyance path and the fourth branch conveyance path such that the normal banknote identified in the identification unit is conveyed to the transit cassette, and control the upper conveyance path and the third branch conveyance path such that the rejection banknote identified in the identification unit is conveyed to the reject cassette.

The control unit may be configured to control the conveyance path such that the medium conveyed from the transit cassette is conveyed to the identification unit, the medium identified as the normal banknote in the identification unit is conveyed to the recycle cassette, and the medium identified as the rejection banknote in the identification unit is conveyed to the deposit cassette, and control the conveyance path such that the medium stored in the deposit cassette is conveyed through the identification unit to the transit cassette.

The control unit may be configured to control the fourth branch conveyance path and the upper conveyance path such that a medium replenished from the transit cassette is conveyed to the identification unit, control the upper conveyance path, the lower conveyance path, and the second branch conveyance path such that a medium identified as the normal banknote in the identification unit is conveyed to the recycle cassette, control the upper conveyance path, the lower conveyance path, and the eighth branch conveyance path such that a medium identified as the rejection banknote in the identification unit is conveyed to the deposit cassette, and then control the eighth branch conveyance path, the lower conveyance path, the upper conveyance path, and the fourth branch conveyance path such that the medium stored in the deposit cassette is conveyed through the identification unit to the transit cassette.

The reject cassette may be disposed at a lower portion of a front of the safe to be positioned adjacent to the transit cassette.

The apparatus may further include a temporary retention unit configured to temporarily store a medium. The conveyance path may convey the medium between the entrance, the reception unit, the identification unit, the temporary retention unit, the deposit cassette, and the recycle cassette. The control unit may be configured to control the conveyance path such that the medium stored in the deposit cassette is conveyed through the identification unit to the temporary retention unit, and then the medium conveyed from the transit cassette is conveyed to the identification unit, and the medium identified as the normal banknote in the identification unit is conveyed to the recycle cassette.

The control unit may control the conveyance path such that the medium identified as the rejection banknote in the identification unit is conveyed to the deposit cassette.

The control unit may control the conveyance path such that the medium stored in the deposit cassette is conveyed through the identification unit to the transit cassette.

The apparatus may further include a reject cassette configured to store the rejection banknote. The control unit may be configured to control the conveyance path such that the medium stored in the temporary retention unit is conveyed to the identification unit, the medium identified as the normal banknote in the identification unit is conveyed to the deposit cassette, and the medium identified as the rejection banknote in the identification unit is conveyed to the reject cassette.

The conveyance path may include: an upper conveyance path configured to provide a moving path of the medium deposited into and withdrawn from the identification unit; a lower conveyance path connected to the upper conveyance path to form a closed loop; a first branch conveyance path providing a medium moving path between the upper conveyance path and the temporary retention unit; a second branch conveyance path providing a medium moving path between the lower conveyance path and the recycle cassette; a third branch conveyance path providing a medium moving path between the lower conveyance path and the reject cassette; a fourth branch conveyance path providing a medium moving path between the entrance and a front connection point of the upper conveyance path and the lower conveyance path; and an eighth branch conveyance path providing a medium moving path between the lower conveyance path and the deposit cassette.

The control unit may be configured to control the eighth branch conveyance path, the lower conveyance path, the upper conveyance path, and the first branch conveyance path such that the medium stored in the deposit cassette is conveyed through the identification unit to the temporary retention unit, control the fourth branch conveyance path and the upper conveyance path such that the medium carried from the transit cassette is conveyed to the identification unit, and control the upper conveyance path, the lower conveyance path, and the second branch conveyance path such that the medium identified as the normal banknote in the identification unit is conveyed to the recycle cassette.

The control unit may be configured to control the upper conveyance path, the lower conveyance path, and the eighth branch conveyance path such that the medium identified as the rejection banknote in the identification unit is conveyed to the deposit cassette.

The control unit may be configured to control the eighth branch conveyance path, the lower conveyance path, the upper conveyance path, and the fourth branch conveyance path such that the medium stored in the deposit cassette is conveyed through the identification unit to the transit cassette.

The control unit may be configured to control the first branch conveyance path and the upper conveyance path such that the medium stored in the temporary retention unit is conveyed to the identification unit, control the upper conveyance path, the lower conveyance path and the eighth branch conveyance path such that the medium identified as the normal banknote in the identification unit is conveyed to the deposit cassette, and controls the upper conveyance path, the lower conveyance path and the third branch conveyance path such that the medium identified as the rejection banknote in the identification unit is conveyed to the reject cassette.

In accordance with a second aspect of the present disclosure, there is provided a method of controlling a medium storing apparatus including: a medium conveying step of conveying a medium stored in a recycle cassette and a deposit cassette to an identification unit; a primary medium identification step of identifying whether the medium conveyed to the identification unit is a normal banknote or a rejection banknote; a medium recovery step of recovering the medium, identified as the normal banknote in the identification unit, through a recovery transit cassette connected to a safe; and a rejection banknote storage step of conveying the medium, identified as the rejection banknote in the identification unit, to a reject cassette.

The method may further include: a medium input step of receiving a medium from a replenishment transit cassette connected to a safe and conveying the medium to the identification unit; a secondary medium identification step of identifying whether the medium conveyed to the identification unit is a normal banknote or a rejection banknote; a medium replenishment step of conveying the medium identified as the normal banknote in the secondary medium identification step to the recycle cassette to store the medium therein; a temporary storage step of conveying the medium identified as the rejection banknote in the secondary medium identification step to the deposit cassette to temporarily store the medium therein; and a rejection banknote treatment step of conveying the medium temporarily stored in the deposit cassette through the identification unit to the replenishment transit cassette.

According to embodiments of the present disclosure, it is advantageous in that a deposit cassette is used as a space for temporarily storing mediums when being replenished with the mediums, so it is possible to reduce a failure rate as compared to a case in which a temporary retention unit temporarily stores mediums.

Further, according to embodiments of the present disclosure, it is advantageous in that a replenishment transit cassette required for the replenishment of mediums and a recovery transit cassette required for the recovery of mediums are used, respectively, so the mediums can be simply and rapidly replenished and recovered.

Further, according to embodiments of the present disclosure, it is advantageous in that, among mediums stored in a recycle cassette and a deposit cassette, a normal medium (normal banknote) can be recovered to a recovery transit cassette, and among mediums carried from a replenishment transit cassette, a rejection banknote can be temporarily stored in a deposit cassette, and then be conveyed again to the replenishment transit cassette.

Further, according to embodiments of the present disclosure, it is advantageous in that it is possible to replenish mediums through a transit cassette, in a state where the mediums stored in a deposit cassette are temporarily stored in a temporary retention unit, and the mediums temporarily stored in the temporary retention unit may be re-separated into a normal banknote and a rejection banknote.

DETAILED DESCRIPTION

Figure 1:
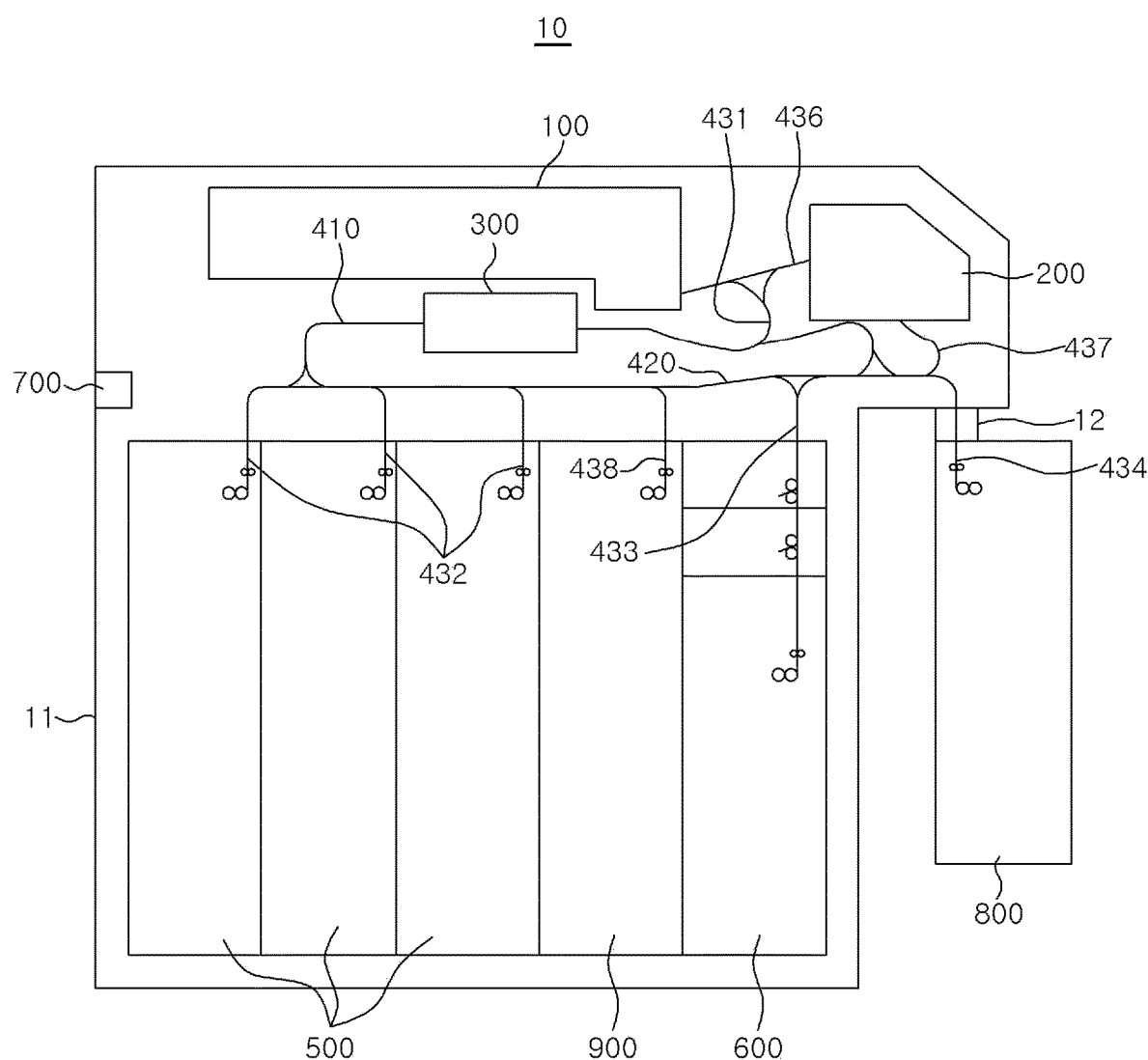
FIG. 1 is a diagram schematically illustrating the configuration of a medium storing apparatus according to a first embodiment of the present disclosure.

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, 'supported' by, 'accessed' to, 'supplied' to, 'transferred' to, or 'contacted' with another element, it should be understood that the element may be directly connected to, supported by, accessed to, supplied to, transferred to, or contacted with another element, but that other elements may exist in the middle.

The terms used in the present disclosure are only used for describing specific embodiments, and are not intended to limit the present disclosure. Singular expressions include plural expressions unless the context clearly indicates otherwise.

Further, in the present disclosure, it is to be noted that expressions, such as the upper side and the lower side, are described based on the illustration of drawings, but may be modified if directions of corresponding objects are changed. For the same reasons, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

First Embodiment

Hereinafter, the specific configuration of a medium storing apparatus 10 according to a first embodiment of the present disclosure will be described with reference to the accompanying drawings.

As shown in FIGS. 1 to 6, the medium storing apparatus 10 according to the first embodiment of the present disclosure may recover a medium stored in a recycle cassette 500 and a deposit cassette 900 through a transit cassette 800. Further, the medium storing apparatus 10 may replenish the recycle cassette 500 with a quantity of mediums required for replenishment through the transit cassette 800, and may transfer a rejection banknote occurring during replenishment back to the transit cassette 800 using the deposit cassette 900.

Such a medium storing apparatus 10 may include a safe 11, a temporary retention unit 100, a reception unit 200, an identification unit 300, a conveyance path, a recycle cassette 500, a reject cassette 600, a control unit 700, and a deposit cassette 900.

The safe 11 may provide a storage space to store mediums therein. In this embodiment, the safe 11 is not limited to a banknote storage space, but the safe 11 may include a frame/housing that defines the entire appearance of the medium storing apparatus 10.

The reception unit 200 may be provided on an upper and front portion of the safe 11. Here, the front of the safe 11 may be understood as a direction (right side of the drawing) where the reception unit 200 through which the deposit and withdrawal of mediums are made by a customer is located. An entrance 12 for replenishment and recovery to which the transit cassette 800 is connectable may be provided on a lower side of the front portion of the safe 11. Further, the temporary retention unit 100 may be provided on an upper and rear portion of the safe 11.

The temporary retention unit 100 may be used for temporarily storing mediums. The temporary retention unit 100 may be connected to an upper conveyance path 410 through a first branch conveyance path 431 that will be described later.

The identification unit 300 may recognize mediums as either a normal banknote or a rejection banknote, by identifying whether the medium moving along the conveyance path is normal or abnormal. In this specification, the mediums may be divided into the normal banknote and the rejection banknote. The normal banknote is a replenishment banknote that needs to be replenished in the medium storing apparatus 10, or a recovery banknote that needs to be recovered from the medium storing apparatus 10 to the transit cassette 800. Further, the rejection banknote may be an abnormal banknote, and may be a damaged or forged banknote or be paper other than banknotes. For example, the rejection banknote may be a torn banknote, a forged banknote, or a receipt. In addition, the rejection banknote may include a normal banknote that is not damaged in the recycle cassette 500, the deposit cassette 900, and the transit cassette 800 but is damaged while moving along the conveyance path, and a normal banknote that is not damaged when it is carried into the temporary retention unit 100 but is damaged when it is carried out from the temporary retention unit 100 and is moved along the conveyance path.

The reception unit 200 may provide a space in which a medium deposited by a customer is carried, and may provide a space from which a medium that needs to be withdrawn by a customer is taken. The reception unit 200 may be connected to a first branch conveyance path 431 through a sixth branch conveyance path 436 that will be described later. When a customer deposits a medium, the reception unit 200 may transfer the deposited medium through the sixth branch conveyance path 436, the first branch conveyance path 431, and the upper conveyance path 410 to the identification unit 300. In addition, the reception unit 200 may be connected through a seventh branch conveyance path 437 to a front connection point at which the upper conveyance path 410 and the lower conveyance path 420 are connected.

The recycle cassette 500 may store a medium. The medium stored in the recycle cassette 500 may be taken out through the transit cassette 800 when a recovery is required, and the medium may be taken out through the reception unit 200 when a customer requests withdrawal. A plurality of recycle cassettes 500 may be provided. The mediums may be separated and stored in the plurality of recycle cassettes 500 according to the type of banknotes.

A sensor (not shown) may be provided in the recycle cassette 500 to maintain a proper amount of mediums according to the type of mediums in preparation for a customer's withdrawal request. Such a sensor may sense whether a proper amount of mediums is stored in the recycle cassette 500, and may inform a company managing the medium storing apparatus 10 whether it is necessary to replenish the recycle cassette 500 with mediums or recover mediums therefrom.

The reject cassette 600 may store a damaged medium (e.g. rejection banknote). The reject cassette 600 may be disposed at a lower and front portion of the safe 11 to be positioned adjacent to the transit cassette 800. Since the reject cassette 600 is disposed adjacent to the transit cassette 800, mediums may be rapidly moved between the reject cassette 600 and the transit cassette 800.

For instance, in the case that a medium which is being transferred from the transit cassette 800 to the recycle cassette 500 is damaged during the transfer and is identified as the rejection banknote in the identification unit 300, the rejection banknote may be stored in the reject cassette 600. Further, when the medium which is being transferred from the recycle cassette 500 to the transit cassette 800 is damaged during the transfer, so the medium is identified as the rejection banknote in the identification unit 300, the rejection banknote may be stored in the reject cassette 600.

The deposit cassette 900 may store a medium deposited through the reception unit 200. For instance, the medium deposited in the reception unit 200 by a customer's deposit request may be carried through the identification unit 300 into the deposit cassette 900. The deposit cassette 900 may be provided with a sensor (not shown) that senses a proper amount of mediums deposited by a customer. This sensor may sense whether a proper amount of mediums is stored in the deposit cassette 900 in real time, and may inform a company managing the medium storing apparatus 10 whether it is necessary to replenish the deposit cassette 900 with mediums or recover mediums therefrom.

The conveyance path may convey mediums between the temporary retention unit 100, the identification unit 300, the reception unit 200, the recycle cassette 500, the reject cassette 600, and the transit cassette 800. Such a conveyance path may include a driving roller, a driven roller, a switch gate, etc. to transfer the mediums. Further, the conveyance path may be driven by a motor (not shown), and may be controlled by a control unit 700. The conveyance path may include an upper conveyance path 410, a lower conveyance path 420, a first branch conveyance path 431, a second branch conveyance path 432, a third branch conveyance path 433, a fourth branch conveyance path 434, a seventh branch conveyance path 437, and an eighth branch conveyance path 438.

The upper conveyance path 410 may provide a moving path of mediums that are deposited in and withdrawn from the identification unit 300. The upper conveyance path 410 may be connected to the lower conveyance path 420 to form a closed loop. The upper conveyance path 410 may be provided above the lower conveyance path 420. The first branch conveyance path 431 may branch from the upper conveyance path 410. The upper conveyance path 410 may transmit mediums, transferred from the temporary retention unit 100 or the reception unit 200, through the identification unit 300 to the lower conveyance path 420, or may transmit mediums of the identification unit 300 to the temporary retention unit 100, the reception unit 200 or the lower conveyance path 420.

The lower conveyance path 420 may be connected to the upper conveyance path 410 to form a closed loop. The second branch conveyance path 432 may branch from the lower conveyance path 420. In the lower conveyance path 420, a branching point to the recycle cassette 500 and a branching point to the reject cassette 600 may be sequentially placed in the direction toward the front of the safe 11.

The switch gate may be provided at the branch point of the lower conveyance path 420 under the control of the control unit 700. The lower conveyance path 420 may convey mediums, transferred from the upper conveyance path 410, to the recycle cassette 500 by adjusting the switch gate under the control of the control unit 700, or may convey mediums, conveyed from the recycle cassette 500, to the upper conveyance path 410.

The first branch conveyance path 431 may branch from the upper conveyance path 410 to provide a medium moving path between the upper conveyance path 410 and the temporary retention unit 100. The first branch conveyance path 431 may branch upwardly from the upper conveyance path 410. The sixth branch conveyance path 436 may branch from the first branch conveyance path 431. The switch gate operated under the control of the control unit 700 may be provided at a branch point of the first branch conveyance path 431 from which the sixth branch conveyance path 436 branches.

The second branch conveyance path 432 may include a plurality of second branch conveyance paths 432 and the recycle cassette 500 may include a plurality of recycle cassette 500. The second branch conveyance paths 432 may branch from the lower conveyance path 420 to provide medium moving paths between the lower conveyance path 420 and the recycle cassettes 500. At least one branching point of the second branch conveyance paths 432 may be disposed on the front side of the rear end of the lower conveyance path 420.

The third branch conveyance path 433 may branch from a connection point between the upper conveyance path 410 and the lower conveyance path 420. The third branch conveyance path 433 may branch towards a lower portion of a front of the lower conveyance path 420. The third branch conveyance path 433 may provide a medium moving path between the upper conveyance path 410 and the reject cassette 600, or may provide a medium moving path between the lower conveyance path 420 and the reject cassette 600, by adjusting the switch gate under the control of the control unit 700.

The fourth branch conveyance path 434 may provide a medium moving path between a front connection point of the upper conveyance path 410 and the lower conveyance path 420 and the entrance 12 for replenishment and recovery. For example, the fourth branch conveyance path 434 may convey a medium, conveyed from the transit cassette 800, to the upper conveyance path 410, or may convey a medium, conveyed from the upper conveyance path 410, to the transit cassette 800.

The sixth branch conveyance path 436 may branch from the first branch conveyance path 431 to be connected to the reception unit 200. The sixth branch conveyance path 436 may provide a medium moving path between the reception unit 200 and the temporary retention unit 100, or may provide a medium moving path between the reception unit 200 and the upper conveyance path 410, by adjusting the switch gate under the control of the control unit 700.

The seventh branch conveyance path 437 may branch from the connection point between the upper conveyance path 410 and the lower conveyance path 420 to be connected to the reception unit 200. The seventh branch conveyance path 437 may convey a medium, conveyed from the reception unit 200, to the lower conveyance path 420, by adjusting the switch gate under the control of the control unit 700.

The eighth branch conveyance path 438 may branch from the lower conveyance path 420 to be connected to the deposit cassette 900. The eighth branch conveyance path 438 may provide a medium moving path between the lower conveyance path 420 and the deposit cassette 900, by adjusting the switch gate under the control of the control unit 700.

The switch gates may be provided at branch points of the upper conveyance path 410, the lower conveyance path 420, the first branch conveyance path 431, the second branch conveyance path 432, the third branch conveyance path 433, the fourth branch conveyance path 434, the sixth branch conveyance path 436, the seventh branch conveyance path 437, and the eighth branch conveyance path 437 to switch a banknote moving path. The switch gate may selectively determine the banknote moving path under the control of the control unit 700, by changing its posture through rotation.

The control unit 700 may control the conveyance path such that the normal banknote is conveyed to the transit cassette 800 and the rejection banknote is conveyed to the reject cassette 600, among mediums stored in the recycle cassette 500 and the deposit cassette 900. Further, the control unit 700 may control the conveyance path such that the normal banknote is conveyed to the recycle cassette 500, the rejection banknote is temporarily stored in the deposit cassette 900 and then the medium temporarily stored in the deposit cassette 900 is conveyed back to the transit cassette 800, among mediums carried through the transit cassette 800. The control unit 700 may be implemented by a calculation device including a microprocessor, a measuring device such as a sensor, and a memory. Since the implementation method is obvious to those skilled in the art, a detailed description thereof will be omitted. Hereinafter, the control method of the control unit 700 will be described in detail.

Figure 2:
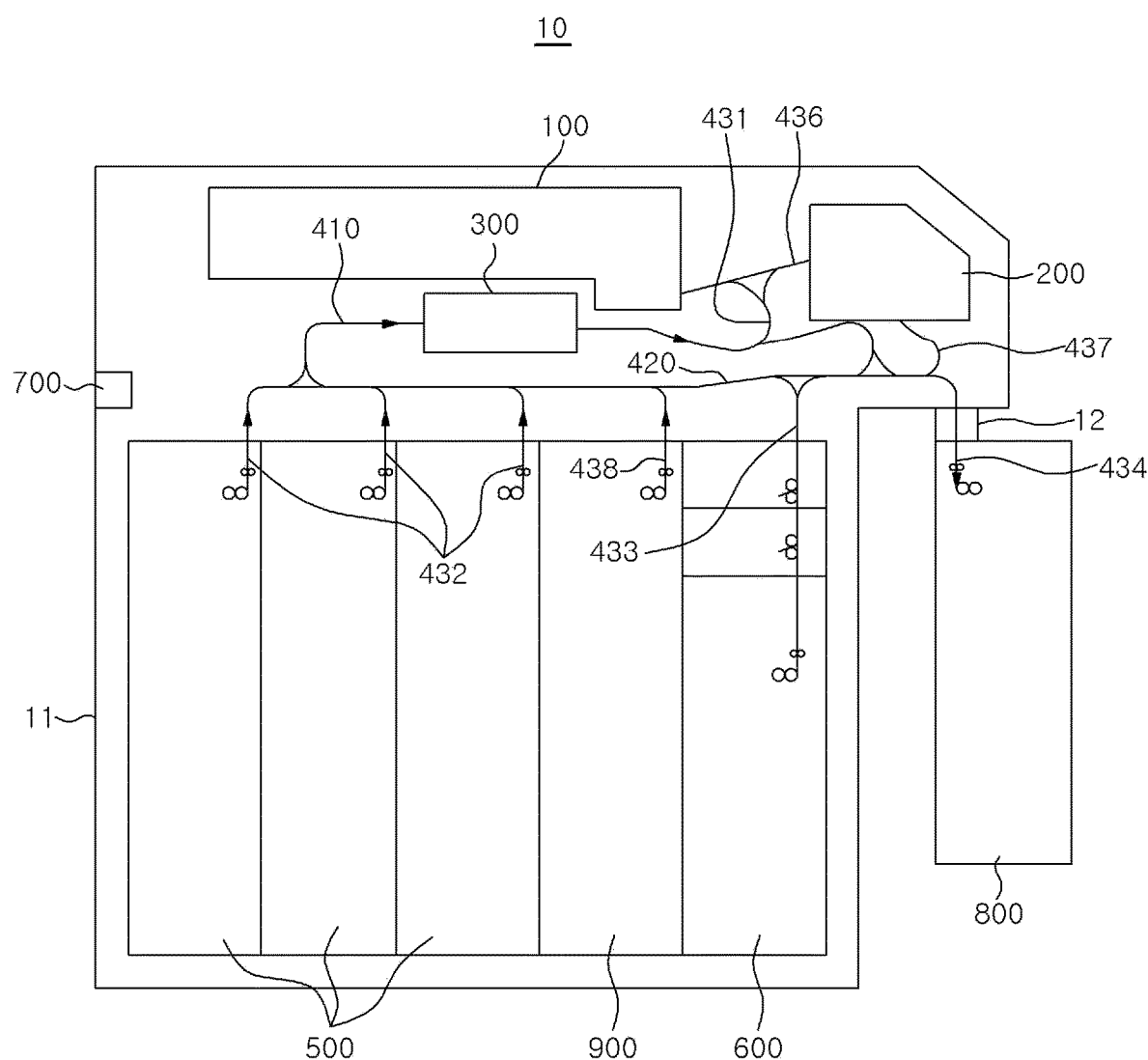
FIG. 2 is a state diagram illustrating a path along which a medium of a deposit cassette and a recycle cassette is transferred through an identification unit to a transit cassette, in the medium storing apparatus according to the first embodiment of the present disclosure.
Figure 3:
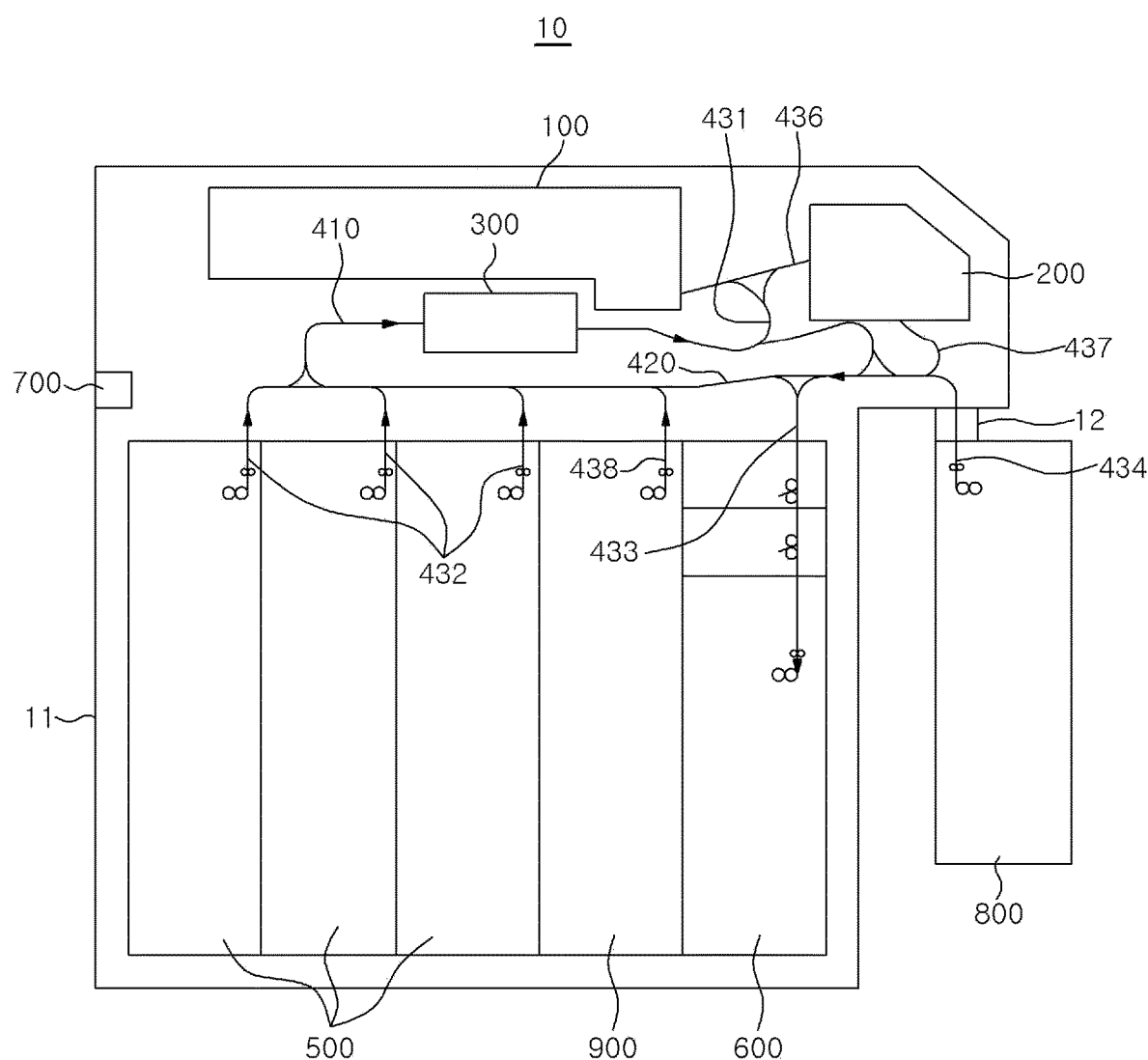
FIG. 3 is a state diagram illustrating a path along which the medium of the deposit cassette and the recycle cassette is transferred through the identification unit to a reject cassette, in the medium storing apparatus according to the first embodiment of the present disclosure.

Referring to FIGS. 2 and 3, the control unit 700 may control the second branch conveyance path 432, the eighth branch conveyance path 438, the lower conveyance path 420, and the upper conveyance path 410 to transfer mediums stored in the recycle cassette 500 and the deposit cassette 900 to the identification unit 300. Further, the control unit 700 may control the conveyance path to transfer mediums to different places according to the types of the mediums identified in the identification unit 300.

For example, as shown in FIG. 2, the control unit 700 may control the upper conveyance path 410 and the fourth branch conveyance path 434 such that the normal banknote identified in the identification unit 300 is conveyed to the transit cassette 800. Further, as shown in FIG. 3, the control unit 700 may control the upper conveyance path 410 and the third branch conveyance path 433 such that the rejection banknote identified in the identification unit 300 is conveyed to the reject cassette 600.

Figure 4:
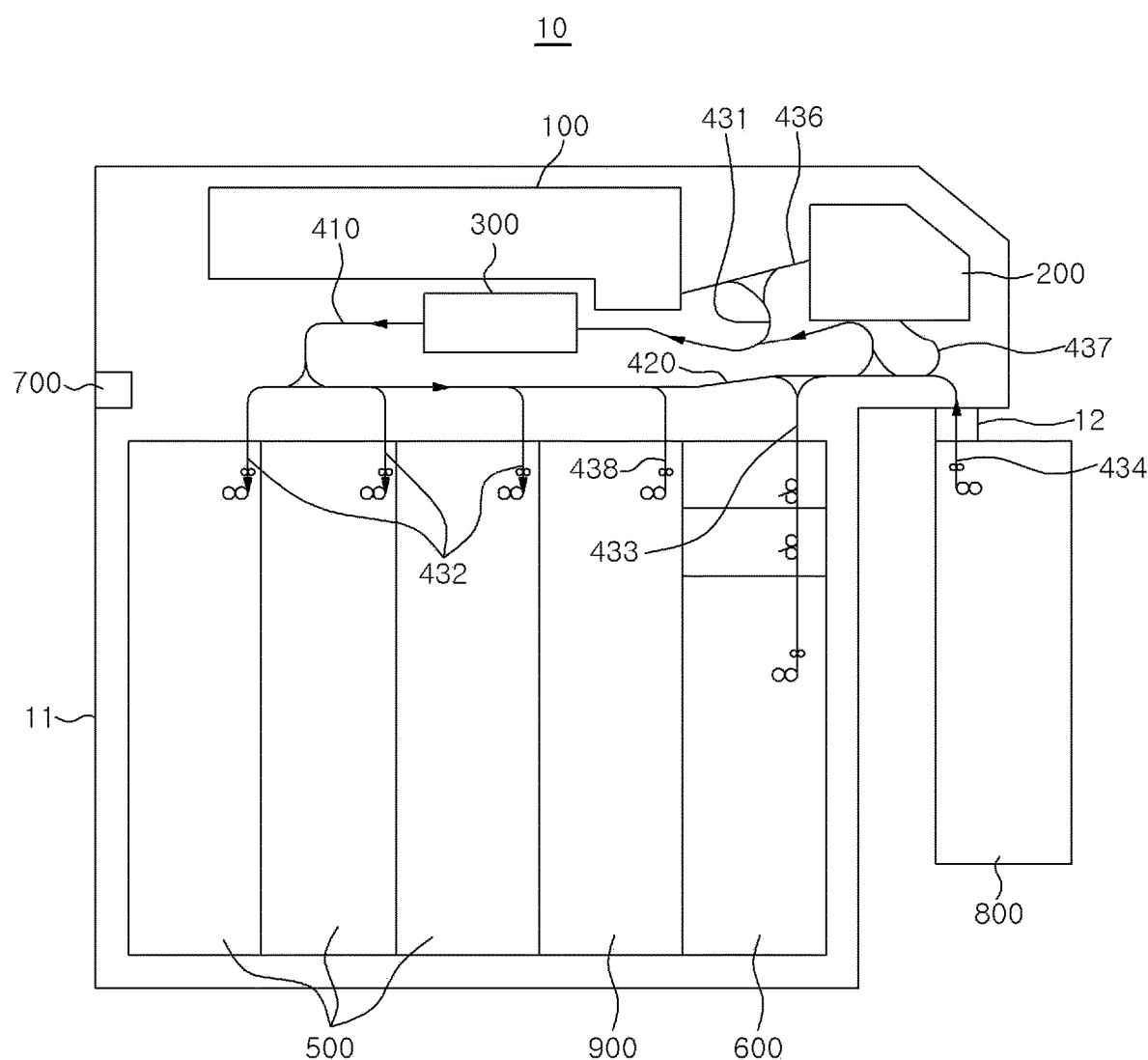
FIG. 4 is a state diagram illustrating a path along which the medium of the transit cassette is transferred through the identification unit to the recycle cassette, in the medium storing apparatus according to the first embodiment of the present disclosure.
Figure 5:
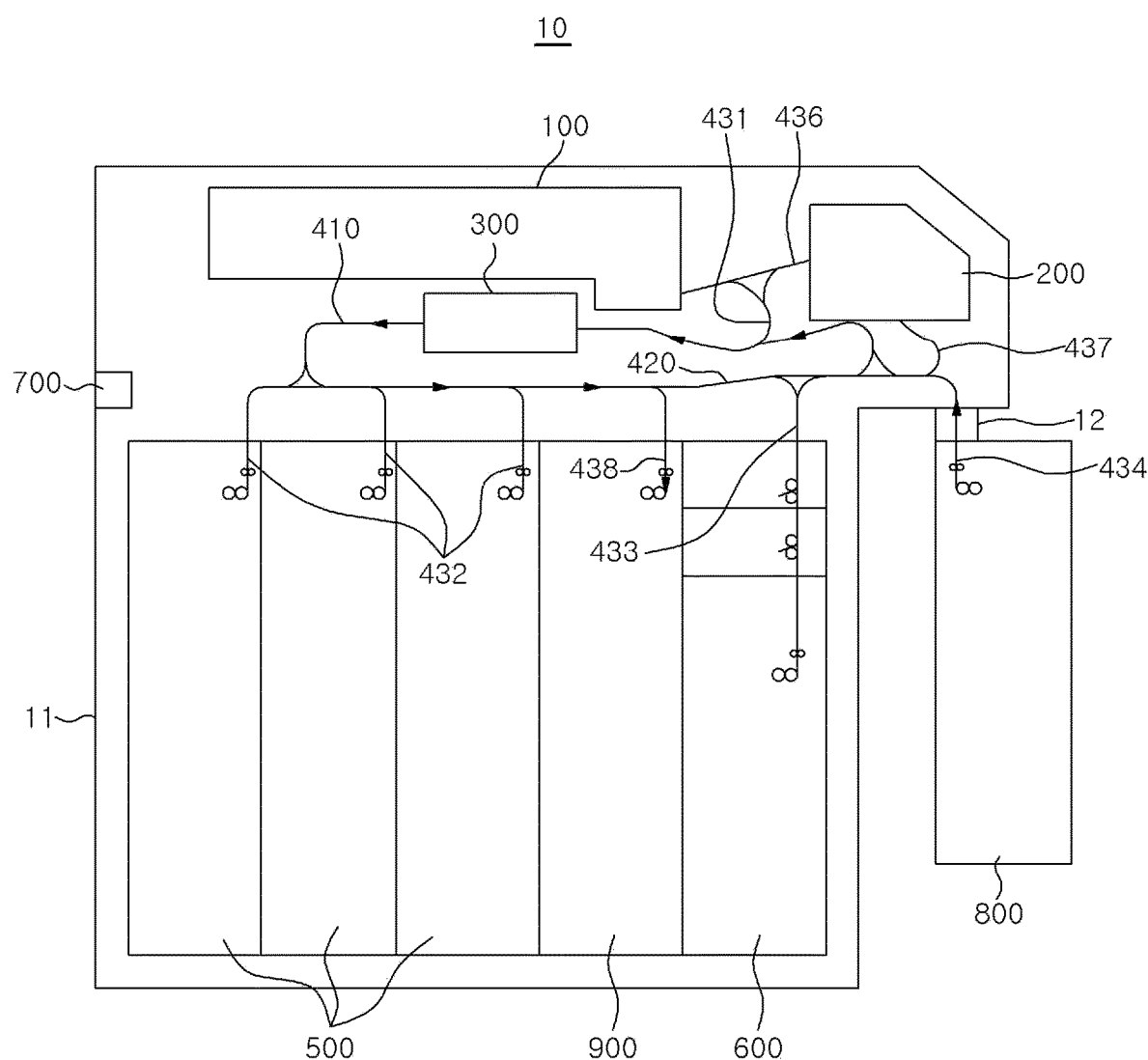
FIG. 5 is a state diagram illustrating a path along which the medium of the transit cassette is transferred through the identification unit to the deposit cassette, in the medium storing apparatus according to the first embodiment of the present disclosure.

Meanwhile, referring to FIGS. 4 and 5, the control unit 700 may control the fourth branch conveyance path 434 and the upper conveyance path 410 to convey mediums, conveyed from the transit cassette 800, to the identification unit 300. Further, the control unit 700 may control the conveyance path to convey mediums to different places according to the types of the mediums identified in the identification unit 300.

By way of example, as shown in FIG. 4, the control unit 700 may control the upper conveyance path 410, the lower conveyance path 420, and the second branch conveyance path 432 such that the normal banknote identified in the identification unit 300 is conveyed to the recycle cassette 500. Further, as shown in FIG. 5, the control unit 700 may control the upper conveyance path 410, the lower conveyance path 420, and the eighth branch conveyance path 438 such that the rejection banknote identified in the identification unit 300 is conveyed to the deposit cassette 900. In other words, when a conveyed medium is damaged and is identified as the rejection banknote in the identification unit 300, the control unit 700 may control the upper conveyance path 410, the lower conveyance path 420, and the eighth branch conveyance path 438 such that the rejection banknote is conveyed to the deposit cassette 900.

Figure 6:
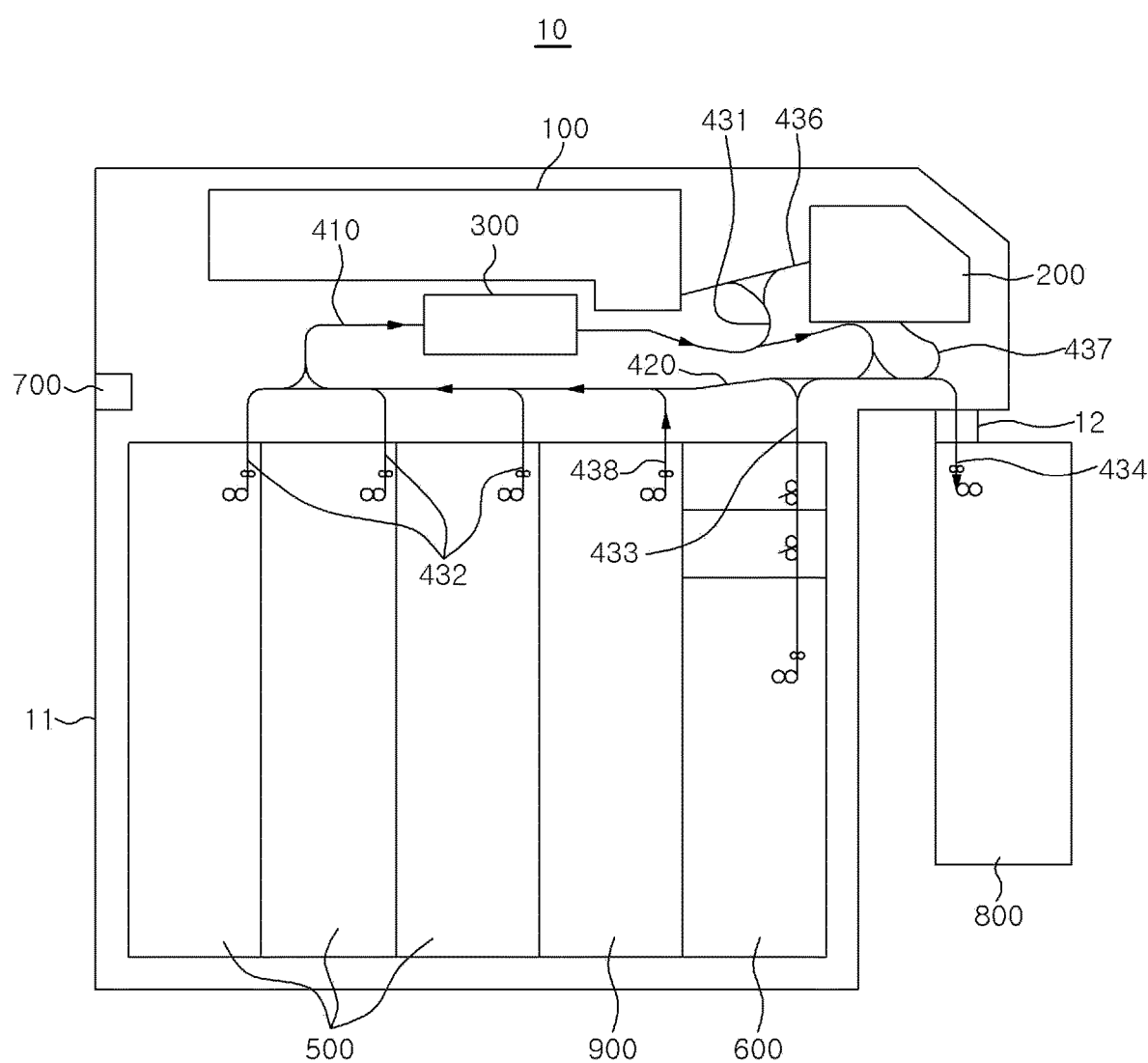
FIG. 6 is a state diagram illustrating a path along which the medium temporarily stored in the deposit cassette is transferred through the identification unit to the transit cassette, in the medium storing apparatus according to the first embodiment of the present disclosure.

Referring to FIG. 6, the control unit 700 may control the eighth branch conveyance path 438, the lower conveyance path 420, the upper conveyance path 410, and the fourth branch conveyance path 434 to transfer mediums, which are temporarily stored in the deposit cassette 900, through the identification unit 300 to the transit cassette 800.

Hereinafter, a method of controlling the medium storing apparatus will be described according to the first embodiment of the present disclosure.

Referring to FIGS. 2 to 6, the method of controlling the medium storing apparatus may provide a method of controlling the medium storing apparatus 10 to recover mediums stored in the recycle cassette 500 and the deposit cassette 900 through the transit cassette 800, replenish the recycle cassette 500 with mediums carried through the transit cassette 800, and convey rejection banknotes occurring during replenishment back to the transit cassette 800 using the deposit cassette 900.

Figure 7:
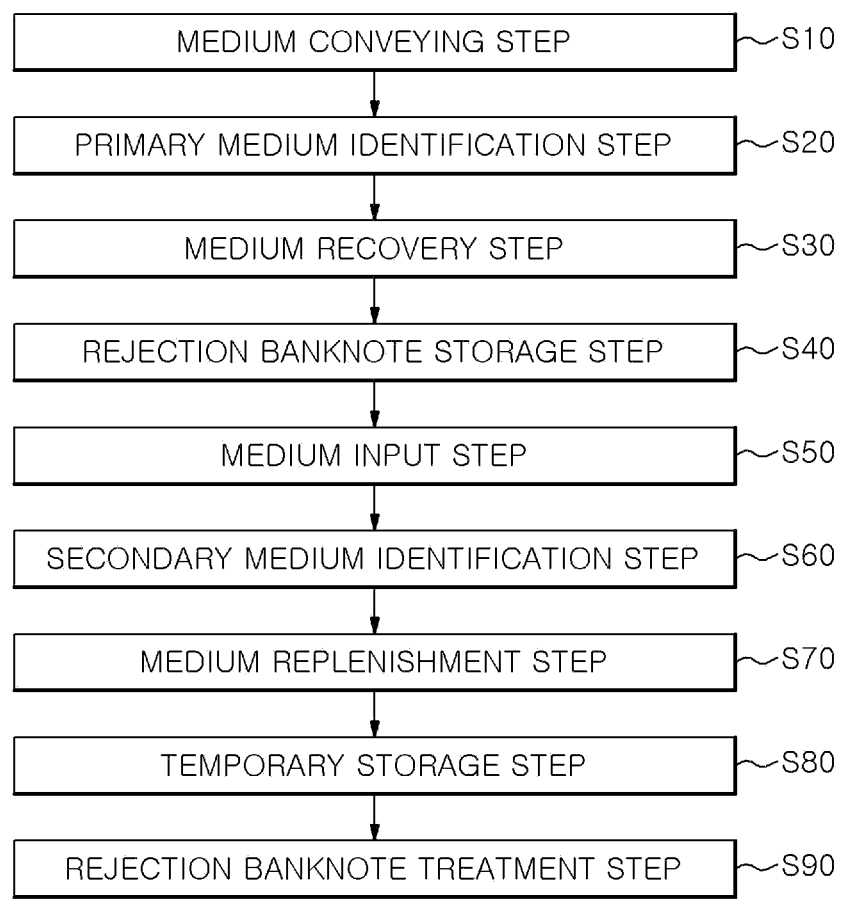
FIG. 7 is a flowchart schematically illustrating a method of controlling the medium storing apparatus, according to the first embodiment of the present disclosure.

As shown in FIG. 7, the method of controlling the medium storing apparatus may include a medium conveying step S10, a primary medium identification step S20, a medium recovery step S30, a rejection banknote storage step S40, a medium input step S50, a secondary medium identification step S60, a medium replenishment step S70, a temporary storage step S80, and a rejection banknote treatment step S90.

In the medium conveying step S10, mediums stored in the recycle cassette 500 and the deposit cassette 900 may be conveyed to the identification unit 300. In the medium conveying step S10, mediums stored in the recycle cassette 500 and the deposit cassette 900 may be conveyed through the second branch conveyance path 432, the eighth branch conveyance path 438, the lower conveyance path 420, and the upper conveyance path 410 to the identification unit 300.

In the primary medium identification step S20, a medium conveyed to the identification unit 300 may be identified and recognized as the normal banknote or the rejection banknote. In the primary medium identification step S20, the medium recognized as the normal banknote may be conveyed to the transit cassette 800 for recovery. In the primary medium identification step S20, the mediums recognized as the rejection banknote may be conveyed to the reject cassette 600.

In the medium recovery step S30, the medium identified as the normal banknote in the identification unit 300 may be recovered through the transit cassette 800 for recovery connected to the safe 11. In the medium recovery step S30, the medium identified as the normal banknote in the identification unit 300 may be conveyed through the upper conveyance path 410 and the fourth branch conveyance path 434 to the transit cassette 800 (see FIG. 2).

In the rejection banknote storage step S40, the medium identified as the rejection banknote in the identification unit 300 may be conveyed to and stored in the reject cassette 600. In the identification unit 300, the medium recognized as the rejection banknote may be conveyed through the upper conveyance path 410, the lower conveyance path 420, and the third branch conveyance path 433 to the reject cassette 600 (see FIG. 3).

In the medium input step S50, in a state where the transit cassette 800 for replenishment is connected to the safe 11, a medium conveyed from the transit cassette 800 connected to the safe 11 may be conveyed to the identification unit 300. In the medium input step S50, the medium in the transit cassette 800 may be conveyed through the fourth branch conveyance path 434 and the upper conveyance path 410 to the identification unit 300. In the embodiment, although the replenishment transit cassette 800 and the recovery transit cassette 800 are denoted by the same reference numeral, the replenishment transit cassette 800 is a transit cassette that is different from the above-described recovery transit cassette 800. For instance, the replenishment transit cassette 800 is a transit cassette only for replenishment, while the recovery transit cassette 800 is a transit cassette only for recovery.

In the secondary medium identification step S60, the medium conveyed to the identification unit 300 may be identified and recognized as the normal banknote or the rejection banknote. The medium recognized as the normal banknote in the secondary medium identification step S60 may be conveyed to the recycle cassette 500. The medium recognized as the rejection banknote in the secondary medium identification step S60 may be conveyed to the reject cassette 600.

In the medium replenishment step S70, the medium identified as the normal banknote in the identification unit 300 may be conveyed to and stored in the recycle cassette 500. The medium identified as the normal banknote in the medium replenishment step S70 may be conveyed through the upper conveyance path 410, the lower conveyance path 420, and the second branch conveyance path 432 to the recycle cassette 500 (see FIG. 4).

In the temporary storage step S80, the medium identified in the identification unit 300 as the rejection banknote may be conveyed to the deposit cassette 900 to be temporarily stored therein. The medium identified as the rejection banknote in the temporary storage step S80 may be conveyed through the upper conveyance path 410, the lower conveyance path 420, and the eighth branch conveyance path 438 to the deposit cassette 900 (see FIG. 5).

In the rejection banknote treatment step S90, the medium temporarily stored in the deposit cassette 900 may be conveyed through the identification unit 300 to the replenishment transit cassette 800. In the rejection banknote treatment step S90, the medium temporarily stored in the deposit cassette 900 may be conveyed through the eighth branch conveyance path 438, the lower conveyance path 420, the upper conveyance path 410, and the fourth branch conveyance path 434 to the transit cassette 800 (see FIG. 6).

Second Embodiment

Hereinafter, the specific configuration of the medium storing apparatus 10 according to a second embodiment of the present disclosure will be described with reference to the accompanying drawings. In the following description, a duplicated description of the medium storing apparatus of the first embodiment will be omitted, and a difference from the first embodiment will be mainly described.

As shown in FIGS. 8 to 11, the medium storing apparatus 10 according to the second embodiment of the present disclosure may store a quantity of mediums required for replenishment through the transit cassette 800 in the recycle cassette 500 provided in the medium storing apparatus 10 after temporarily storing the mediums contained in the deposit cassette 900 in the temporary retention unit 100, and a medium identified as the rejection banknote may be conveyed back to the transit cassette 800 after being temporarily stored in the deposit cassette 900.

The control unit 700 may control to store a quantity of mediums required for replenishment through the transit cassette 800 in the recycle cassette 500 after temporarily storing the mediums contained in the deposit cassette 900 in the temporary retention unit 100, and the medium identified as the rejection banknote may be conveyed back to the transit cassette 800 after being temporarily stored in the deposit cassette 900. The control unit 700 may be implemented by a calculation device including a microprocessor, a measuring device such as a sensor, and a memory. Since the implementation method is obvious to those skilled in the art, a detailed description thereof will be omitted. Hereinafter, the control method of the control unit 700 will be described in detail.

Figure 8:
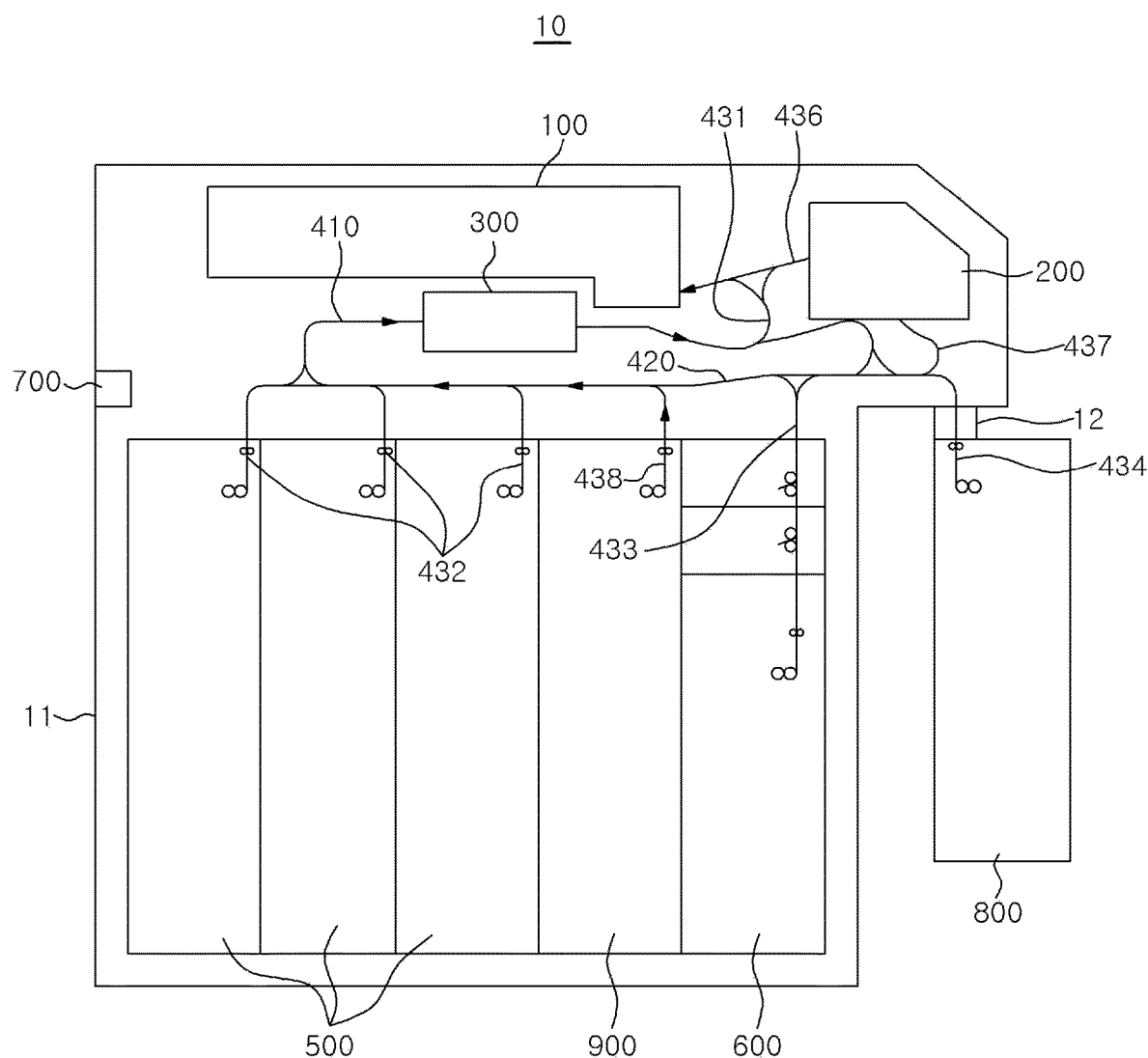
FIG. 8 is a state diagram illustrating a path along which a medium of a deposit cassette is transferred through an identification unit to a transit cassette, in a medium storing apparatus according to a second embodiment of the present disclosure.

For instance, referring to FIG. 8, the control unit 700 may control to transfer the medium stored in the deposit cassette 900 through the identification unit 300 to the temporary retention unit 100. The control unit 700 may control the eighth branch conveyance path 438, the lower conveyance path 420, the upper conveyance path 410, and the first branch conveyance path 431 to transfer the medium stored in the deposit cassette 900 through the identification unit 300 to the temporary retention unit 100.

Figure 9:
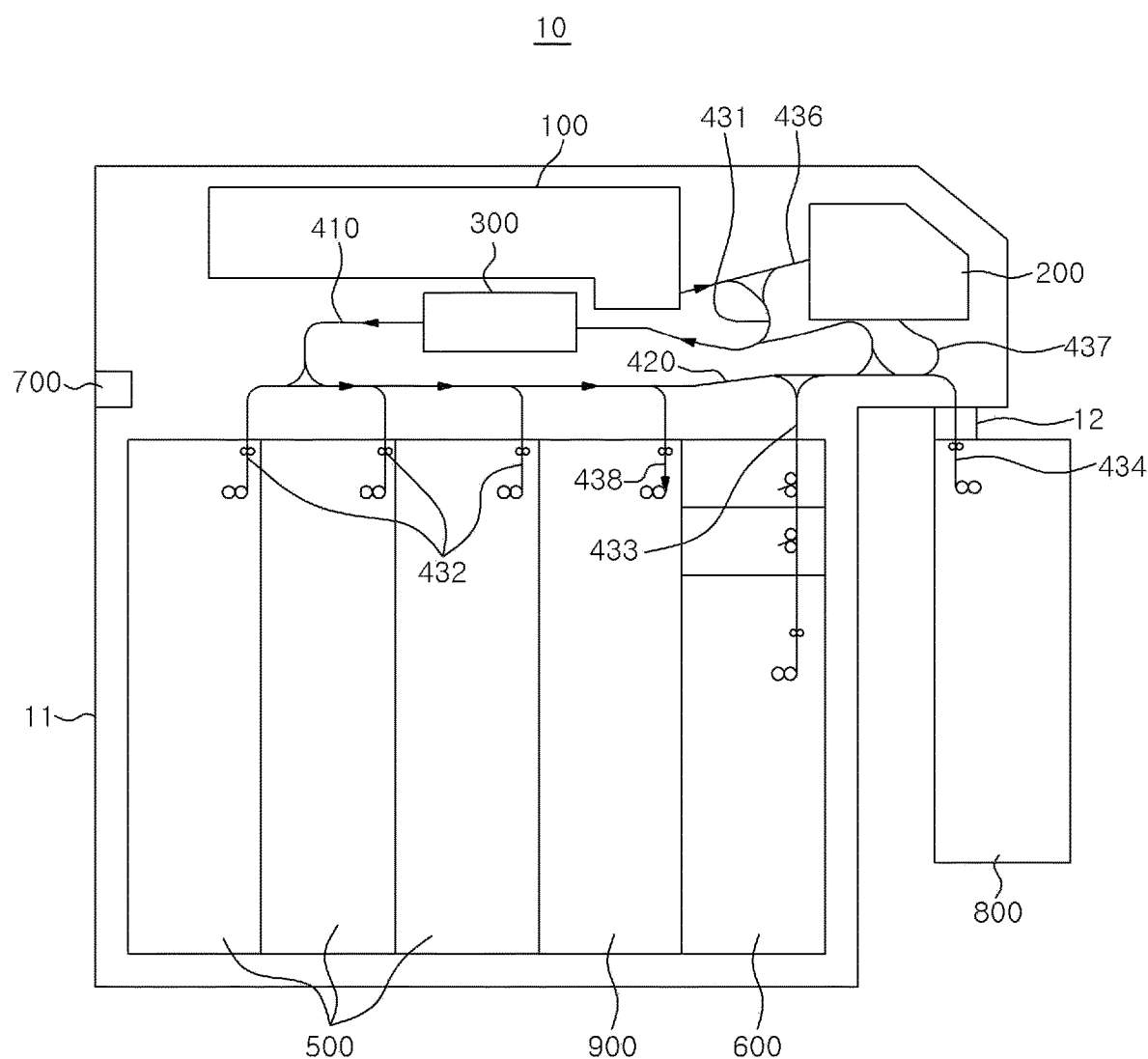
FIG. 9 is a state diagram illustrating a path along which the medium stored in a temporary retention unit of FIG. 8 is transferred through the identification unit to the deposit cassette.
Figure 10:
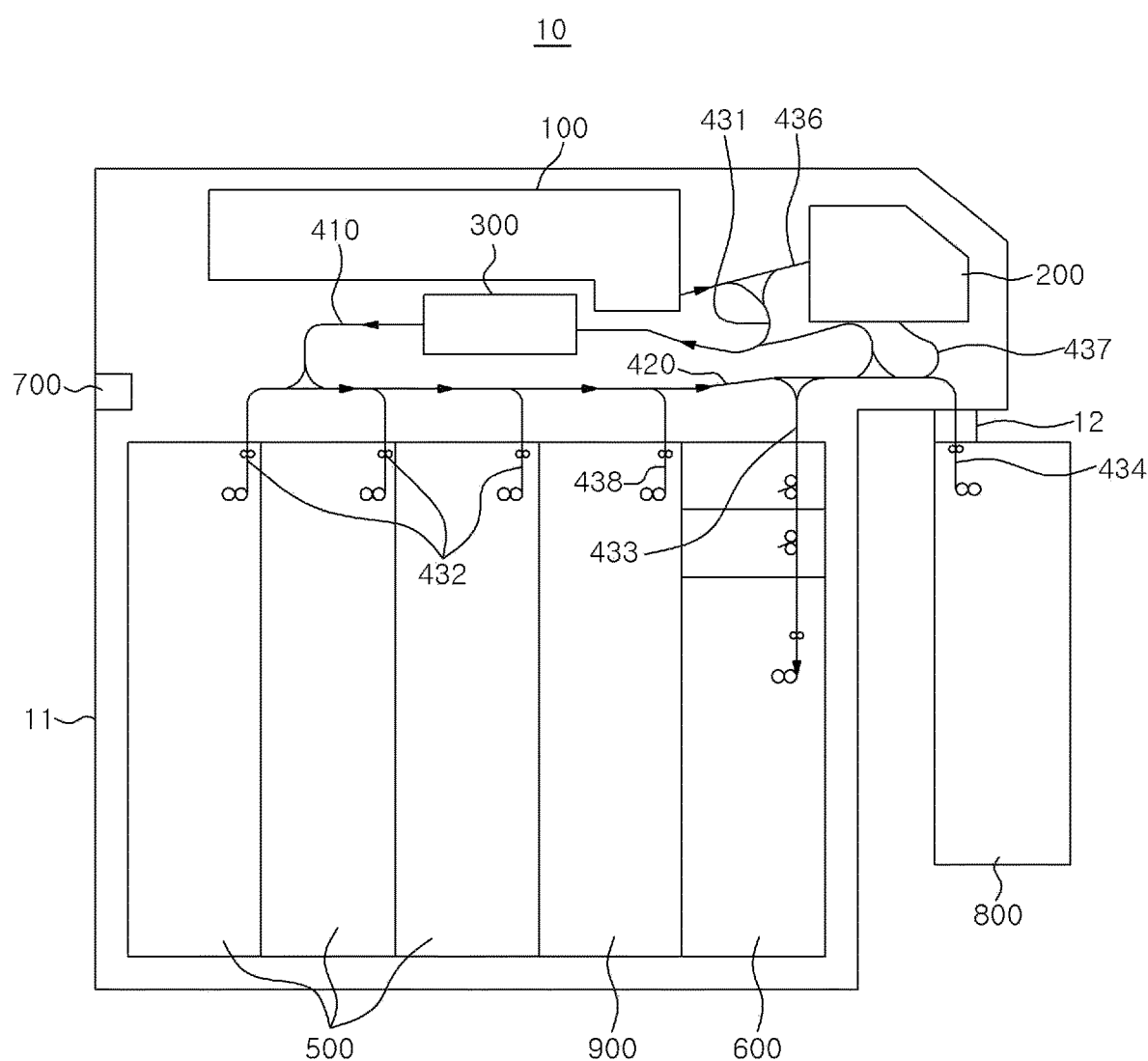
FIG. 10 is a state diagram illustrating a path along which the medium stored in the temporary retention unit of FIG. 8 is transferred through the identification unit to the reject cassette.

Referring to FIGS. 9 and 10, the control unit 700 may control the first branch conveyance path 431 and the upper conveyance path 410 to convey the medium stored in the temporary retention unit 100 to the identification unit 300. Further, the control unit 700 may control the conveyance path to convey mediums to different places according to the types of the mediums identified in the identification unit 300.

For example, as shown in FIG. 9, the control unit 700 may control the upper conveyance path 410, the lower conveyance path 420, and the eighth branch conveyance path 438 such that the normal banknote identified in the identification unit 300 is conveyed to the deposit cassette 900.

Hereinafter, a method of controlling the medium storing apparatus will be described according to an embodiment of the present disclosure.

Referring to FIGS. 8 to 11, the method of controlling the medium storing apparatus may provide a method of controlling the medium storing apparatus 10 to store the medium of the transit cassette 800 in the recycle cassette 500 after temporarily storing the medium contained in the deposit cassette 900 in the temporary retention unit 100, to convey the medium back to the transit cassette 800 after temporarily storing the medium identified as the rejection banknote in the deposit cassette 900, to store the normal banknote in the deposit cassette 900 among mediums temporarily stored in the temporary retention unit 100, and to store the rejection banknote in the reject cassette 600.

Figure 11:
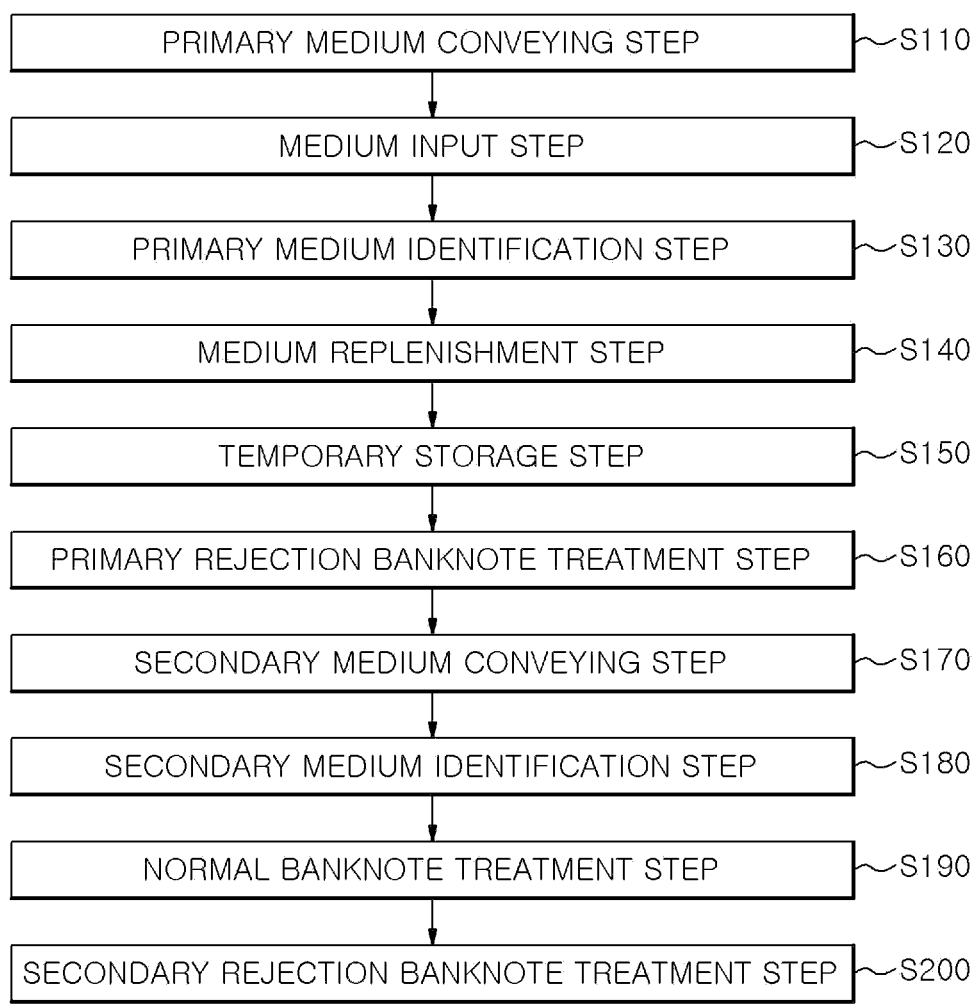
FIG. 11 is a flowchart schematically illustrating a method of controlling the medium storing apparatus, according to the second embodiment of the present disclosure.

As shown in FIG. 11, the method of controlling the medium storing apparatus may include a primary medium conveying step S110, a medium input step S120, a primary medium identification step S130, a medium replenishment step S140, a temporary storage step S150, a primary rejection banknote treatment step S160, a secondary medium conveying step S170, a secondary medium identification step S180, a normal banknote treatment step S190, and a secondary rejection banknote treatment step S200.

In the primary medium conveying step S110, the medium stored in the deposit cassette 900 may be conveyed through the identification unit to the temporary retention unit 100. In the primary medium conveying step S110, the medium stored in the deposit cassette may be conveyed through the eighth branch conveyance path 438, the lower conveyance path 420, the upper conveyance path 410, and the first branch conveyance path 431 to the temporary retention unit 100 (see FIG. 8).

In the medium input step S120, in a state where the transit cassette 800 is connected to the safe 11, the medium conveyed from the transit cassette 800 connected to the safe 11 may be conveyed to the identification unit 300. In the medium input step S120, the medium in the transit cassette 800 may be conveyed through the fourth branch conveyance path 434 and the upper conveyance path 410 to the identification unit 300.

In the primary medium identification step S130, the medium conveyed to the identification unit 300 may be recognized as the normal banknote or the rejection banknote. The medium recognized as the normal banknote in the primary medium identification step S130 may be conveyed to the recycle cassette 500. The medium recognized as the rejection banknote in the primary medium identification step S130 may be conveyed to the deposit cassette 900.

In the medium replenishment step S140, the recycle cassette 500 may be replenished with the medium identified as the normal banknote in the identification unit 300. The medium identified as the normal banknote in the medium replenishment step S140 may be conveyed through the upper conveyance path 410, the lower conveyance path 420, and the second branch conveyance path 432 to the recycle cassette 500.

In the temporary storage step S150, the medium identified as the rejection banknote in the identification unit 300 may be conveyed to the deposit cassette 900 to be temporarily stored. The medium identified as the rejection banknote in the temporary storage step S150 may be conveyed through the upper conveyance path 410, the lower conveyance path 420, and the eighth branch conveyance path 438 to the deposit cassette 900.

In the primary rejection banknote treatment step S160, the medium temporarily stored in the deposit cassette 900 may be conveyed through the identification unit 300 to the transit cassette 800. In the primary rejection banknote treatment step S160, the medium temporarily stored in the deposit cassette 900 may be conveyed through the eighth branch conveyance path 438, the lower conveyance path 420, the upper conveyance path 410, and the fourth branch conveyance path 434 to the transit cassette 800.

In the secondary medium conveying step S170, the medium stored in the temporary retention unit 100 may be conveyed to the identification unit 300. In the secondary medium conveying step S170, the medium stored in the temporary retention unit 100 may be conveyed through the first branch conveyance path 431 and the upper conveyance path 410 to the identification unit 300.

In the secondary medium identification step S180, the medium conveyed to the identification unit 300 may be identified and recognized as the normal banknote or the rejection banknote. The medium recognized as the normal banknote in the secondary medium identification step S180 may be conveyed to the deposit cassette 900. The medium recognized as the rejection banknote in the secondary medium identification step S180 may be conveyed to the reject cassette 600.

In the normal banknote treatment step S190, the medium identified as the normal banknote in the identification unit 300 may be conveyed to the deposit cassette 900. The medium recognized as the normal banknote in the identification unit 300 may be conveyed through the upper conveyance path 410, the lower conveyance path 420, and the eighth branch conveyance path 438 to the deposit cassette 900.

In the secondary rejection banknote treatment step S200, the medium identified as the rejection banknote in the identification unit 300 may be conveyed to the reject cassette 600. The medium recognized as the rejection banknote in the identification unit 300 may be conveyed through the upper conveyance path 410, the lower conveyance path 420, and the third branch conveyance path 433 to the reject cassette 600.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. An apparatus for storing a medium comprising:
   a safe having an entrance for replenishment and recovery to which a transit cassette is selectively connected;
   a reception unit configured to deposit and withdraw a medium by a customer;
   an identification unit serving to identify whether the medium is a normal banknote or a rejection banknote;
   a deposit cassette configured to store the medium deposited through the reception unit;
   a recycle cassette configured to store the medium recognized as the normal banknote;
   a conveyance path configured to convey the medium;
   a control unit configured to control the conveyance path; and
   a temporary retention unit configured to temporarily store a medium,
   wherein the conveyance path conveys the medium between the entrance, the reception unit, the identification unit, the temporary retention unit, the deposit cassette, and the recycle cassette, and
   wherein the control unit is configured to control the conveyance path such that the medium stored in the deposit cassette is conveyed through the identification unit to the temporary retention unit, and then the medium conveyed from the transit cassette is conveyed to the identification unit, and the medium identified as the rejection banknote in the identification unit is conveyed to the deposit cassette.

2. The apparatus of claim 1, wherein
   the control unit is configured to control the conveyance path to convey the medium stored in the deposit cassette and the recycle cassette to the identification unit, and the medium identified as the normal banknote in the identification unit to the transit cassette.

3. The apparatus of claim 2, further comprising:
   a reject cassette configured to store the rejection banknote,
   wherein the control unit is configured to control the conveyance path to convey the medium identified as the rejection banknote in the identification unit to the reject cassette.

4. The apparatus of claim 3, wherein the conveyance path comprises:
   an upper conveyance path configured to provide a moving path of the medium deposited into and withdrawn from the identification unit;
   a lower conveyance path connected to the upper conveyance path to form a closed loop;
   a second branch conveyance path providing a medium moving path between the lower conveyance path and the recycle cassette;
   a third branch conveyance path providing a medium moving path between the lower conveyance path and the reject cassette;
   a fourth branch conveyance path providing a medium moving path between the entrance and a front connection point of the upper conveyance path and the lower conveyance path; and
   an eighth branch conveyance path providing a medium moving path between the lower conveyance path and the deposit cassette.

5. The apparatus of claim 4, wherein the control unit is configured to control the second branch conveyance path, the eighth branch conveyance path, the lower conveyance path, and the upper conveyance path such that the medium stored in the recycle cassette and the deposit cassette is conveyed to the identification unit, control the upper conveyance path and the fourth branch conveyance path such that the normal banknote identified in the identification unit is conveyed to the transit cassette, and control the upper conveyance path and the third branch conveyance path such that the rejection banknote identified in the identification unit is conveyed to the reject cassette.

6. The apparatus of claim 3, wherein the reject cassette is disposed at a lower portion of a front of the safe to be positioned adjacent to the transit cassette.

7. The apparatus of claim 2, wherein the control unit is configured to control the conveyance path such that the medium conveyed from the transit cassette is conveyed to the identification unit, the medium identified as the normal banknote in the identification unit is conveyed to the recycle cassette, and the medium identified as the rejection banknote in the identification unit is conveyed to the deposit cassette, and control the conveyance path such that the medium stored in the deposit cassette is conveyed through the identification unit to the transit cassette.

8. The apparatus of claim 7, wherein the control unit is configured to control the fourth branch conveyance path and the upper conveyance path such that a medium replenished from the transit cassette is conveyed to the identification unit, control the upper conveyance path, the lower conveyance path, and the second branch conveyance path such that a medium identified as the normal banknote in the identification unit is conveyed to the recycle cassette, control the upper conveyance path, the lower conveyance path, and the eighth branch conveyance path such that a medium identified as the rejection banknote in the identification unit is conveyed to the deposit cassette, and then control the eighth branch conveyance path, the lower conveyance path, the upper conveyance path, and the fourth branch conveyance path such that the medium stored in the deposit cassette is conveyed through the identification unit to the transit cassette.

9. The apparatus of claim 1,
   wherein the control unit controls the conveyance path such that the medium identified as the normal banknote in the identification unit is conveyed to the recycle cassette.

10. The apparatus of claim 9, wherein the control unit controls the conveyance path such that the medium stored in the deposit cassette is conveyed through the identification unit to the transit cassette.

11. The apparatus of claim 9, further comprising:
a reject cassette configured to store the rejection banknote,
wherein the control unit is configured to control the conveyance path such that the medium stored in the temporary retention unit is conveyed to the identification unit, the medium identified as the normal banknote in the identification unit is conveyed to the deposit cassette, and the medium identified as the rejection banknote in the identification unit is conveyed to the reject cassette.

12. The apparatus of claim 11, wherein the conveyance path comprises:
an upper conveyance path configured to provide a moving path of the medium deposited into and withdrawn from the identification unit;
a lower conveyance path connected to the upper conveyance path to form a closed loop;
a first branch conveyance path providing a medium moving path between the upper conveyance path and the temporary retention unit;
a second branch conveyance path providing a medium moving path between the lower conveyance path and the recycle cassette;
a third branch conveyance path providing a medium moving path between the lower conveyance path and the reject cassette;
a fourth branch conveyance path providing a medium moving path between the entrance and a front connection point of the upper conveyance path and the lower conveyance path; and
an eighth branch conveyance path providing a medium moving path between the lower conveyance path and the deposit cassette.

13. The apparatus of claim 12, wherein the control unit is configured to control the eighth branch conveyance path, the lower conveyance path, the upper conveyance path, and the first branch conveyance path such that the medium stored in the deposit cassette is conveyed through the identification unit to the temporary retention unit, control the fourth branch conveyance path and the upper conveyance path such that the medium carried from the transit cassette is conveyed to the identification unit, and control the upper conveyance path, the lower conveyance path, and the second branch conveyance path such that the medium identified as the normal banknote in the identification unit is conveyed to the recycle cassette.

14. The apparatus of claim 13, wherein the control unit is configured to control the upper conveyance path, the lower conveyance path, and the eighth branch conveyance path such that the medium identified as the rejection banknote in the identification unit is conveyed to the deposit cassette.

15. The apparatus of claim 14, wherein the control unit is configured to control the eighth branch conveyance path, the lower conveyance path, the upper conveyance path, and the fourth branch conveyance path such that the medium stored in the deposit cassette is conveyed through the identification unit to the transit cassette.

16. The apparatus of claim 15, wherein the control unit is configured to control the first branch conveyance path and the upper conveyance path such that the medium stored in the temporary retention unit is conveyed to the identification unit, control the upper conveyance path, the lower conveyance path and the eighth branch conveyance path such that the medium identified as the normal banknote in the identification unit is conveyed to the deposit cassette, and controls the upper conveyance path, the lower conveyance path and the third branch conveyance path such that the medium identified as the rejection banknote in the identification unit is conveyed to the reject cassette.

17. A method of controlling a medium storing apparatus comprising:
a medium conveying step of conveying a medium stored in a recycle cassette and a deposit cassette to an identification unit;
a primary medium identification step of identifying whether the medium conveyed to the identification unit is a normal banknote or a rejection banknote;
a medium recovery step of recovering the medium, identified as the normal banknote in the identification unit, through a recovery transit cassette connected to a safe;
a rejection banknote storage step of conveying the medium, identified as the rejection banknote in the identification unit, to a reject cassette;
a medium input step of receiving a medium from a replenishment transit cassette connected to a safe and conveying the medium to the identification unit;
a secondary medium identification step of identifying whether the medium conveyed to the identification unit is a normal banknote or a rejection banknote;
a medium replenishment step of conveying the medium identified as the normal banknote in the secondary medium identification step to the recycle cassette to store the medium therein;
a temporary storage step of conveying the medium identified as the rejection banknote in the secondary medium identification step to the deposit cassette to temporarily store the medium therein; and
a rejection banknote treatment step of conveying the medium temporarily stored in the deposit cassette through the identification unit to the replenishment transit cassette.

* * * * *